United States Patent [19]

Shelley, Jr.

[11] 3,914,202
[45] Oct. 21, 1975

[54] EPOXY RESIN COMPOSITIONS CONTAINING 2-CHLORO-1-CHLOROMETHYLETHYL-2,3-EPOXY PROPYL ETHER

[75] Inventor: Ralph Ray Shelley, Jr., Lake Jackson, Tex.

[73] Assignee: The Dow Chemical Company, Midland, Mich.

[22] Filed: May 8, 1974

[21] Appl. No.: 468,042

[52] U.S. Cl...... 260/47 EP; 117/161 ZB; 260/2 EP; 260/59; 260/830 TW
[51] Int. Cl.²......................................... C08G 30/04
[58] Field of Search..... 260/30.4 EP, 348 R, 47 EP, 260/59, 830 TW, 2 EP

[56] References Cited
OTHER PUBLICATIONS

Handbook of Epoxy Resins, Lee & Neville, 1967, (pp. 13–17 to 13–14).

Primary Examiner—Melvin Goldstein
Assistant Examiner—T. Pertilla
Attorney, Agent, or Firm—James G. Carter

[57] ABSTRACT

This application discloses an epoxy resin composition containing, as a reactive diluent, 2-chloro-1-chloromethylethyl-2,3-epoxy propyl ether. These compositions do not reduce the physical properties of the cured resins as found in cured epoxy resin systems containing the usual diluents such as butyl glycidyl ether.

8 Claims, No Drawings

EPOXY RESIN COMPOSITIONS CONTAINING 2-CHLORO-1-CHLOROMETHYLETHYL-2,3-EPOXY PROPYL ETHER

The present invention pertains to epoxy resins containing reactive diluents and cured products thereof.

Epoxy resins, for the most part, are usually highly viscous and for many applications, such as grouting compositions, flooring compositions, coating systems, adhesives and the like, require reactive diluents, such as butyl glycidyl ether and the like, to reduce the viscosity to that which permits easier application. Epoxy resins containing such reactive diluents tend to possess reduced physical properties in the cured state as compared to a like composition containing no reactive diluent.

It has now been unexpectedly discovered that when 2-chloro-1-chloromethylethyl 2,3-epoxypropyl ether, hereinafter sometimes referred to as "DCIPGE" or dichloroisopropyl glycidyl ether, is employed as the reactive diluent the reactivity of the mixture is increased as compared to mixtures of epoxy resins with butyl glycidyl ether. Also, it has been discovered that in some instances one or more of the physical properties of the cured resin-diluent mixtures are improved when DCIPGE is employed as the diluent as compared to resins containing butyl glycidyl ether as the diluent.

The present invention therefore is directed to epoxy resin compositions comprising A. a liquid epoxy resin having an average of more than one 1,2-epoxy group per molecule and B. an effective, but minor amount of 2-chloro-1-chloromethylethyl-2, 3-epoxy propyl ether as a reactive diluent.

The present invention is also directed to cured compositions resulting from curing the epoxy resin-diluent mixture with a suitable curing agent.

The DCIPGE can be prepared by the procedure described in U.S. Pat. No. 3,078,280. In some instances, it occurs as a by-product in the production of epoxy resins from epichlorohydrin and a bisphenol.

Suitable epoxy resins which can be diluted with DCIPGE include those resins described in *HANDBOOK OF EPOXY RESINS* by Lee and Neville, McGraw-Hill, 1967, which contain an average of more than one 1,2-epoxy group per molecule including mixtures of such resins. Particularly suitable are the glycidyl ethers of polyhydric phenols such as, for example, bisphenol A and phenolaldehyde novolac resins.

Suitable curing agents include those described in the above mentioned handbook and include for example, primary, secondary, and tertiary amines, polycarboxylic acids and anhydrides, Lewis acids complexed with ethers and amines, polyamides, mixtures thereof and the like.

Portions of the above mentioned handbook pertaining to epoxy resins, their preparation and curing are incorporated herein by reference.

The DCIPGE is employed in any quantity which is effective to achieve the desired objective, i.e., the desired degree of reactivity and/or viscosity. The DCIPGE is usually employed in quantities of from about 10 to about 95, preferably from about 15 to about 60 and most preferably from about 20 to about 40 parts of DCIPGE per 100 parts of epoxy resin.

The compositions may also contain other reactive diluents, pigments, dyes, fillers, fire retardants, thixotropic agents, flow control and/or leveling agents or other additives, mixtures thereof and the like.

The following examples are illustrative of the present invention but are not to be construed as to limiting the scope thereof.

EXAMPLE 1

The ASTM D-2471-68 mass gel times were compared for an epoxy resin containing DCIPGE, the diluent of the present invention, and butyl glycidyl ether, (BGE), a diluent of the prior art, employing as the epoxy resin a diglycidyl ether of bisphenol A having an average epoxide equivalent weight of about 182–190 and triethylene tetramine (TETA) as the hardener; the epoxy resin and hardener being employed in stoichiometric quantity with the total epoxide content of the mixture, i.e., the epoxide content of both the epoxy resin and diluent.

The results are given in the following Table I, the quantities being as parts by weight.

TABLE I

| Component and Results | SAMPLE NO. | | | |
|---|---|---|---|---|
| | A | B | C | D |
| Epoxy Resin, parts | 100 | 100 | 100 | 100 |
| BGE, parts | — | 13.7 | — | 13.7 |
| DCIPGE, parts | 13.7 | — | 30.5 | — |
| Viscosity, cps at 25°C | — | — | 646 | 632 |
| Gel time*, min. | 28 | 48 | 20 | 48 |

*The Gel time was determined on a 500 gram mass.

EXAMPLE 2

The physical properties of cured resins containing DCIPGE and butyl glycidyl ether (BGE) were compared employing the epoxy resin and hardener of Example 1. The hardener was employed on a stoichiometric basis based upon total epoxide content of the mixture. The compositions and resultant physical properties employing a cure schedule of 16 hours at room temperature plus 3 hours at 100°C are given in the following Table II.

TABLE II

| COMPONENTS AND | SAMPLE NO. | | | |
|---|---|---|---|---|
| | A | B | C | D |
| RESULTS | | | | |
| Epoxy Resin, parts | 100 | 100 | 100 | 100 |
| DCIPGE, parts | 13.7 | — | 30.5 | — |
| BGE, parts | — | 13.7 | — | 13.7 |
| TETA, parts | 14.3 | 14.9 | 16.4 | 14.9 |
| Viscosity, cps at 25°C | — | — | 646 | 632 |
| Tensile strength, psi | 14,719 | 10,710 | 12,236 | 10,665 |
| (kg/cm$^2$) | (1,034.89) | (753.02) | (860.31) | (749.86) |
| Tensile modulus, psi | 7.35 × 10$^5$ | 5.03 × 10$^5$ | 5.32 × 10$^5$ | 5.03 × 10$^5$ |
| (kg/cm$^2$) | (0.52 × 10$^5$) | (0.35 × 10$^5$) | (0.37 × 10$^5$) | (0.35 × 10$^5$) |
| Flexural strength, psi | 22,500 | 11,830 | 21,583 | 19,219 |
| (kg/cm$^2$) | (1581.98) | (831.77) | (1517.5) | (1351.29) |
| Flexural modulus, psi | 5.65 × 10$^5$ | 4.04 × 10$^5$ | 5.68 × 10$^5$ | 4.86 × 10$^5$ |

TABLE II-continued

| COMPONENTS AND RESULTS | SAMPLE NO. | | | |
|---|---|---|---|---|
| | A | B | C | D |
| (kg/cm²) | (0.4 × 10⁵) | (0.28 × 10⁵) | (0.4 × 10⁵) | (0.34 × 10⁵) |
| Ultimate Elongation | — | — | 5.48% | 5.06% |

In the above experiments in Examples 1 and 2, Samples A and C are examples of the present invention, and Samples B and D are examples of the prior art. Samples A and B represent comparisons of the diluents on an equal weight basis, whereas Samples C and D represent comparisons on a substantially equal Viscosity basis.

I claim:
1. An epoxy resin composition comprising
   A. a liquid epoxy resin or mixtures thereof having an average of more than one 1,2-epoxy groups per molecule and
   B. an effective, but minor amount of 2-chloro-1-chloromethylethyl-2,3-epoxypropyl ether as a reactive diluent.
2. The composition of claim 1 wherein component (B) is present in quantities of from about 10 to about 95 parts per 100 parts of component (A).
3. The composition of claim 2 wherein component (A) is a glycidyl ether of a polyhydric phenol and component (B) is present in quantities of from about 15 to about 60 parts per 100 parts of component (A).
4. The composition of claim 3 wherein the polyhydric phenol is bisphenol A.
5. A cured composition which comprises an epoxy resin composition of claim 1 and a curing amount of a suitable curing agent.
6. A cured composition comprising an epoxy resin composition of claim 2 and a curing amount of a suitable curing agent.
7. A cured composition comprising an epoxy resin composition of claim 3 and a curing amount of a suitable curing agent.
8. A cured composition comprising an epoxy resin composition of claim 4 and a curing amount of a suitable curing agent.

* * * * *